United States Patent
Savoor et al.

(10) Patent No.: US 11,356,336 B2
(45) Date of Patent: *Jun. 7, 2022

(54) ADJUSTING TRIGGERS FOR AUTOMATIC SCALING OF VIRTUAL NETWORK FUNCTIONS

(71) Applicant: AT&T Intellectual Property I, L.P., Atlanta, GA (US)

(72) Inventors: Raghvendra Savoor, Walnut Creek, CA (US); Frederick Armanino, Milton, GA (US); Cathleen Southwick, San Ramon, CA (US); Robert Roycroft, Algonquin, IL (US); Zhi Li, Palo Alto, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,580

(22) Filed: Nov. 2, 2020

(65) Prior Publication Data
US 2021/0075694 A1    Mar. 11, 2021

Related U.S. Application Data

(63) Continuation of application No. 16/234,248, filed on Dec. 27, 2018, now Pat. No. 10,826,789.

(51) Int. Cl.
*H04L 41/00* (2022.01)
*G06F 9/455* (2018.01)
(Continued)

(52) U.S. Cl.
CPC .......... *H04L 41/20* (2013.01); *G06F 9/45558* (2013.01); *H04L 12/4641* (2013.01); *H04L 43/16* (2013.01); *G06F 2009/45595* (2013.01)

(58) Field of Classification Search
CPC . H04L 41/20; H04L 41/0896; H04L 41/0681; H04L 12/4641; H04L 43/16;
(Continued)

(56) References Cited

U.S. PATENT DOCUMENTS 8,352,608 B1 *   1/2013   Keagy .................. G06F 8/63
                                                 709/226
10,097,421 B1   10/2018   Rajagopal et al.
(Continued)

FOREIGN PATENT DOCUMENTS

EP    3021521 A1    5/2016
WO    2016058318 A1   4/2016
(Continued)

OTHER PUBLICATIONS

"What's Network Functions Virtualization (NFV)?," SDxCentra Studios, Aug. 26, 2013. (Year: 2013).*

*Primary Examiner* — Alina A Boutah (57) ABSTRACT

A method performed by a processor in a network function virtualization infrastructure includes determining an amount of resources consumed by a virtual network function subsequent to a scaling of the amount of resources in response to an occurrence of a predefined trigger event, determining an amount of time elapsed between the predefined trigger event and a completion of the scaling, determining a key performance indicator value for the virtual network function subsequent to completion of the scaling, evaluating an efficiency of the predefined trigger event that triggers the scaling, based on the amount of resources consumed by the virtual network function subsequent to the scaling, the amount of time elapsed between the detection of the predefined trigger event and completion of the scaling, and the key performance indicator for the virtual network function
(Continued)

subsequent to completion of the scaling, and adjusting the predefined trigger event based on the evaluating.

20 Claims, 4 Drawing Sheets (51) Int. Cl.
*H04L 12/46* (2006.01)
*H04L 43/16* (2022.01)

(58) Field of Classification Search
CPC ............ H04L 43/0876; G06F 9/45558; G06F 2009/45595
See application file for complete search history.

(56) References Cited

U.S. PATENT DOCUMENTS

| | | | |
|---|---|---|---|
| 10,409,642 B1* | 9/2019 | Tang | G06F 9/5061 |
| 10,430,258 B2* | 10/2019 | Das | G06F 9/5077 |
| 10,476,742 B1* | 11/2019 | Szarvas | H04L 41/0896 |
| 2014/0089917 A1* | 3/2014 | Attalla | G06F 9/5077 |
| | | | 718/1 |
| 2015/0281113 A1* | 10/2015 | Siciliano | H04L 43/0817 |
| | | | 709/226 |
| 2016/0057234 A1* | 2/2016 | Parikh | H04L 67/16 |
| | | | 709/226 |
| 2016/0103717 A1* | 4/2016 | Dettori | G06F 9/5072 |
| | | | 719/318 |
| 2016/0149771 A1* | 5/2016 | Prasad | H04L 41/12 |
| | | | 709/226 |
| 2016/0165052 A1* | 6/2016 | Reilly | H04M 3/5238 |
| | | | 379/265.1 |
| 2016/0205519 A1* | 7/2016 | Patel | H04L 41/5041 |
| | | | 455/518 |
| 2016/0335111 A1 | 11/2016 | Bruun et al. | |
| 2016/0381150 A1* | 12/2016 | Rajagopal | G06F 9/45558 |
| | | | 709/223 |
| 2017/0060608 A1* | 3/2017 | Raghunathan | G06F 11/14 |
| 2017/0150399 A1 | 5/2017 | Kedalagudde et al. | |
| 2017/0244787 A1* | 8/2017 | Rangasamy | H04L 41/0654 |
| 2017/0257424 A1* | 9/2017 | Neogi | H04L 43/16 |
| 2017/0295082 A1* | 10/2017 | Wu | H04L 67/10 |
| 2017/0339158 A1* | 11/2017 | Lewis | H04L 63/205 |
| 2017/0373938 A1 | 12/2017 | Raether et al. | |
| 2018/0013656 A1* | 1/2018 | Chen | H04W 24/04 |
| 2018/0018244 A1* | 1/2018 | Yoshimura | G06F 13/00 |
| 2018/0032362 A1* | 2/2018 | Buil | H04L 67/10 |
| 2018/0048716 A1* | 2/2018 | Madhayyan | H04L 61/2015 |
| 2018/0063018 A1* | 3/2018 | Bosch | H04L 45/306 |
| 2018/0077020 A1* | 3/2018 | Li | G06F 9/5077 |
| 2018/0131557 A1* | 5/2018 | Chou | H04L 5/0055 |
| 2018/0203741 A1* | 7/2018 | Banerjee | G06F 9/505 |
| 2018/0227241 A1* | 8/2018 | Halimi | G06F 9/45558 |
| 2018/0260261 A1* | 9/2018 | Mohammed | G06F 9/5077 |
| 2018/0302311 A1* | 10/2018 | Holness | H04L 41/0681 |
| 2018/0349195 A1* | 12/2018 | El Khayat | G06F 9/505 |
| 2018/0349202 A1 | 12/2018 | Sharma et al. | |
| 2019/0021010 A1* | 1/2019 | Senarath | H04L 41/0886 |
| 2019/0026168 A1* | 1/2019 | Qiu | G06F 9/45558 |
| 2019/0028350 A1* | 1/2019 | Yeung | H04L 9/0894 |
| 2019/0068619 A1* | 2/2019 | Fan | H04L 63/1416 |
| 2019/0132211 A1* | 5/2019 | Yeung | H04L 41/0816 |
| 2019/0164080 A1* | 5/2019 | Stefani | G06N 3/02 |
| 2019/0220298 A1* | 7/2019 | Jiao | G06F 9/45558 |
| 2019/0222533 A1* | 7/2019 | Lund | H04L 41/0896 |
| 2019/0272002 A1* | 9/2019 | Seenappa | G06F 9/45558 |
| 2019/0306051 A1* | 10/2019 | Seetharaman | H04L 45/42 |
| 2019/0312800 A1* | 10/2019 | Schibler | H04L 41/082 |
| 2019/0379728 A1* | 12/2019 | Hellstrom | G06F 9/5072 |
| 2020/0028749 A1* | 1/2020 | Dhandu | H04L 12/4641 |
| 2020/0106715 A1* | 4/2020 | Bouw | H04L 43/16 |
| 2020/0154292 A1* | 5/2020 | Bor-Yaliniz | H04W 24/02 |

FOREIGN PATENT DOCUMENTS

| | | | | |
|---|---|---|---|---|
| WO | WO-2016121973 A1 * | 8/2016 | ......... | G06F 9/45558 |
| WO | 2017019018 A1 | 2/2017 | | |
| WO | 2017076078 A1 | 5/2017 | | |
| WO | 2017148321 A1 | 9/2017 | | |
| WO | 2018095518 A1 | 5/2018 | | |
| WO | 2018149514 A1 | 8/2018 | | |

\* cited by examiner

ADJUSTING TRIGGERS FOR AUTOMATIC SCALING OF VIRTUAL NETWORK FUNCTIONS

This application is a continuation of U.S. patent application Ser. No. 16/234,248, filed Dec. 27, 2018, now U.S. Pat. No. 10,826,789, which is herein incorporated by reference in its entirety.

The present disclosure relates generally to network function virtualization (NFV), and relates more particularly to devices, computer-readable media, and methods for quantifying the efficiency of virtual network function software and for adjusting virtual network function auto-scaling triggers to improve efficiency.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Network operators can create, update, remove, or scale on/in network functions (NFs) on-demand, construct sequences of NFs to form service function chains (SFCs), and steer traffic through SFCs to meet service requirements.

SUMMARY

In one example, a method performed by a processor deployed in a network function virtualization infrastructure includes determining an amount of resources consumed by a virtual network function subsequent to a scaling of the amount of the resources in response to an occurrence of a predefined trigger event, determining an amount of time elapsed between a detection of the predefined trigger event and a completion of the scaling, determining a value of a key performance indicator for the virtual network function subsequent to the completion of the scaling, evaluating an efficiency of the predefined trigger event that triggers the scaling, based on the amount of the resources consumed by the virtual network function subsequent to the scaling, the amount of time elapsed between the detection of the predefined trigger event and the completion of the scaling, and the key performance indicator for the virtual network function subsequent to the completion of the scaling, and adjusting the predefined trigger event based on the evaluating.

In another example, a non-transitory computer-readable medium stores instructions which, when executed by a processor deployed in a network function virtualization infrastructure, cause the processor to perform operations. The operations include determining an amount of resources consumed by a virtual network function subsequent to a scaling of the amount of the resources in response to an occurrence of a predefined trigger event, determining an amount of time elapsed between a detection of the predefined trigger event and a completion of the scaling, determining a value of a key performance indicator for the virtual network function subsequent to the completion of the scaling, evaluating an efficiency of the predefined trigger event that triggers the scaling, based on the amount of the resources consumed by the virtual network function subsequent to the scaling, the amount of time elapsed between the detection of the predefined trigger event and the completion of the scaling, and the key performance indicator for the virtual network function subsequent to the completion of the scaling, and adjusting the predefined trigger event based on the evaluating.

In another example, a system includes a processor deployed in a network function virtualization infrastructure and a non-transitory computer-readable medium storing instructions which, when executed by the processor, cause the processor to perform operations. The operations include determining an amount of resources consumed by a virtual network function subsequent to a scaling of the amount of the resources in response to an occurrence of a predefined trigger event, determining an amount of time elapsed between a detection of the predefined trigger event and a completion of the scaling, determining a value of a key performance indicator for the virtual network function subsequent to the completion of the scaling, evaluating an efficiency of the predefined trigger event that triggers the scaling, based on the amount of the resources consumed by the virtual network function subsequent to the scaling, the amount of time elapsed between the detection of the predefined trigger event and the completion of the scaling, and the key performance indicator for the virtual network function subsequent to the completion of the scaling, and adjusting the predefined trigger event based on the evaluating.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media, and methods for adjusting virtual network function auto-scaling triggers. As discussed above, network function virtualization (NFV) coupled with software defined networking (SDN) revolutionizes networking by allowing network operators to dynamically modify and manage networks. For instance, the compute, memory, and/or network resources allocated to a virtual network function (VNF) may be increased (scaled up) to handle additional load or reduced (scaled down) to release underutilized resources. Additionally, the network may be scaled out by instantiating new VNFs or scaled in by removing VNFs.

Scaling may be performed automatically in response to a trigger, such as the occurrence of a predefined event (e.g., network traffic falling below or exceeding a predefined threshold, resource utilization by a VNF falling below or exceeding a predefined threshold, etc.), also referred to herein as a "triggering event." The triggers are often provided by the VNF suppliers and may be determined based on limited in-lab testing. However, this testing may not account for all possible network conditions. Thus, the supplier-provided triggers may provide more effective scaling under some network conditions than under others. Moreover, the testing may fail to consider how to balance multiple different triggers. For instance, some triggers may relate to resource usage, while other triggers may relate to workloads, network key performance indicators (KPIs), and/or other metrics.

Examples of the present disclosure quantify the efficiency of a VNF, where the efficiency may be defined by the VNF's unit cost per workload processed (e.g., ability to minimize the use of compute, memory, and network resources while processing workloads). Thus, the VNF's efficiency may be expressed as a workload-specific metric that considers overall resource utilization in addition to unit cost per workload processed. The unit cost may be expressed as, for example, a number of bytes transmitted, a number of concurrent voice calls served, a number of concurrent video streams served, or the like. Thus, put simply, the unit cost may include platform costs (e.g., network and cloud, such as central processing unit, memory, disk, network input/output, etc.), facility costs (e.g., data center physical space), utility costs (e.g., power), and/or maintenance costs. In further examples of the present disclosure, once the efficiency of a VNF has been quantified, the efficiency can be used to measure the effectiveness of current auto-scaling triggers.

In one example, the present disclosure includes a controller, e.g., a software-defined network (SDN) controller, to control the scaling of a network in response to the occurrence of predefined events. In a software defined network, an SDN controller may instantiate virtual network functions (VNFs) on shared hardware, which may be referred to as network function virtualization infrastructure (NFVI), host devices, or SDN nodes, and which may be physically located in various places. For example SDN nodes may reside in various data centers distributed in different locations. For example, a router may be instantiated on an SDN node, and released when the router is no longer needed. Similarly, a media server may be instantiated on an SDN node, and released when no longer needed. In one example, the configuring, releasing, and reconfiguring of SDN nodes is controlled by the SDN controller, which may store configuration code, e.g., computer/processor-executable programs, instruction, code, or the like for various functions which can be loaded onto an SDN node. In another example, the SDN controller may instruct, or request an SDN node to retrieve appropriate configuration code from a network-based repository, e.g., a storage device, to relieve the SDN controller from having to store and transfer configuration code for various functions to the SDN nodes.

Figure 1:
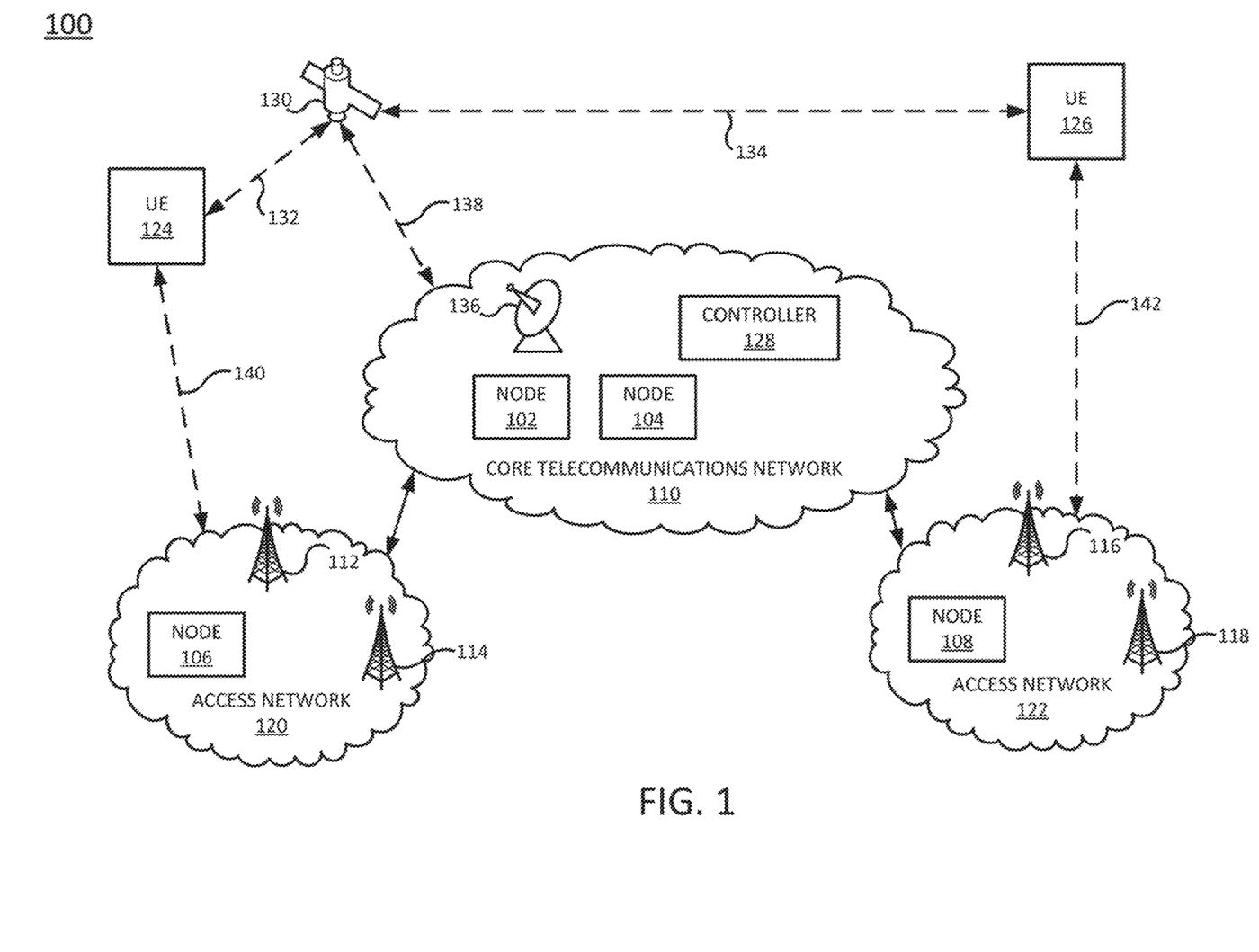
FIG. 1 illustrates an example system related to the present disclosure.

To aid in understanding the present disclosure, FIG. 1 illustrates a block diagram depicting one example of a network, or system 100 suitable for performing or enabling the steps, functions, operations, and/or features described herein. The overall communications system 100 may include any number of interconnected networks which may use the same or different communication technologies. As illustrated in FIG. 1, system 100 may include a core telecommunications network 110. In one example, the core telecommunications network 110 may comprise a backbone network, or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs). However, it will be appreciated that the present disclosure is equally applicable to other types of data units and transport protocols, such as Frame Relay, and Asynchronous Transfer Mode (ATM).

In one example, the core telecommunications network 110 uses a network function virtualization infrastructure (NFVI), e.g., host devices or servers in a data center or data centers that are available as host devices to host virtual machines comprising virtual network functions (VNFs). In other words, at least a portion of the core telecommunications network 110 may incorporate software-defined network (SDN) components. In the example of FIG. 1, NFVI may be represented by nodes 102 and 104. Nodes 102 and 104 may each include central processing units (CPUs), or processors, memory to hold computer-readable/computer-executable instructions, code, and/or programs, and so forth. Thus, nodes 102 and 104 may comprise host devices that are configurable and reconfigurable to provide various network services and/or to perform various tasks and functions under the instruction of controller 128. For instance, nodes 102 and 104 may host configuration code and/or content for various network services. Nodes 102 and 104 may alternatively or additionally provide transcoding services, performing media compression, or perform any other network functions that may be deployed in a host device/NFVI in an NFV architecture.

In one embodiment, the core telecommunications network 110 may be in communication with one or more access networks 120 and 122. The access networks 120 and 122 may include a wireless network (e.g., an Institute of Electrical and Electronics Engineers (IEEE) 802.11/Wi-Fi network and the like), a cellular network (e.g., 2G, 3G, and 4G networks, a Long Term Evolution (LTE) network, 5G network, and the like), a circuit switched network (e.g., a public switched telephone network (PSTN)), a cable network, a digital subscriber line (DSL) network, a metropolitan area network (MAN), an Internet service provider (ISP) network, and the like. As such, in various examples the access points 112, 114, 116, and 118 may comprise wireless transceivers, cellular base stations, such as eNodeBs, and the like. In one example, the access networks 120 and 122 may include different types of networks. In another example, the access networks 120 and 122 may be the same type of network. In one example, the access networks 120 and 122 may be operated by a same entity as the core telecommunications network 110.

In one example, the access networks 120 and 122 may also include an NFVI that is controlled by the controller 128, e.g., nodes 106 and 108. Nodes 106 and 108 may each include central processing units (CPUs), or processors, memory to hold computer-readable/computer-executable instructions, code, and/or programs, and so forth. Thus, nodes 106 and 108 may comprise host devices that are configurable and reconfigurable to provide various network services and/or to perform various tasks and functions under the instruction of controller 128. For instance, nodes 106 and 108 may host configuration code and/or content for various network services. Nodes 106 and 108 may alternatively or additionally provide transcoding services, performing media compression, or perform any other network functions that may be deployed in a host device/NFVI in an NFV architecture.

As illustrated in FIG. 1, the system 100 may further include user endpoint (UE) devices 124 and 126. UEs 124 and 126 may comprise any type of wireless communication-capable mobile telephony and computing device (broadly, a "mobile device"), such as: a mobile phone, a smartphone, a computing tablet, a messaging device, a personal computer, a laptop computer, a Personal Digital Assistant (PDA), a wearable "smart" device (e.g., a smart watch or a fitness tracker), a portable gaming device, and the like. For instance, UEs 124 and 126 may be equipped with at least one cellular radio/transceiver for cellular communications. In another example, UEs 124 and 126 may comprise wired devices capable of communicating over a network, such as a desk top computer, a set top box (STB), a smart television, an Internet of Things (IoT) device (e.g., a smart thermostat, a smart security system, etc.). UEs 124 and 126 may also be equipped for any number of different modes of communication. For instance, UEs 124 and 126 may alternatively or additionally be equipped with an IEEE 802.11 (Wi-Fi) transceiver, an IEEE 802.16 (e.g., wireless metropolitan area network/WiMAX) transceiver, an IEEE 802.15 transceiver (e.g., Bluetooth, ZigBee, etc.), and so on.

In one example, the nodes 102-108 may be managed by the controller 128. In one example, controller 128 may comprise an SDN controller that is responsible for such functions as provisioning and releasing instantiations of VNFs to perform the functions of routers, switches, and other devices, provisioning routing tables and other operating parameters for the VNFs, generating and pushing packet forwarding rules to switches, and so forth. In further examples, the controller 128 may evaluate the efficiency of individual nodes 102-108, where the efficiency may be defined as a node's unit cost per workload processed under varying network traffic conditions (e.g., overload, traffic redirection, etc.). The controller 128 may further evaluate the effectiveness of auto-scaling triggers and make modifications to the auto-scaling triggers where appropriate to improve the efficiency of the auto-scaling triggers.

In one example, controller 128 may maintain communications with VNFs and/or nodes 102-108 via a number of control links. Control links may comprise secure tunnels for signaling communications over an underling IP infrastructure of core telecommunications network 110 and/or access networks 120 and 122. In other words, control links may comprise virtual links multiplexed with transmission traffic and other data carried over a shared set of physical links. In one example, the controller 128 may also comprise a virtual machine (VM) operating on NFVI/host device(s), or may comprise a dedicated device. For instance, controller 128 may be collocated with one or more VNFs, or may be deployed in a different host device or at a different physical location. In one example, the controller 128 may comprise a computing system or server, such as computing system 400 depicted in FIG. 4, and may be configured to evaluate the efficiency of individual nodes 102-108 as described herein, where the efficiency may be defined as a node's unit cost per workload processed under varying network traffic conditions (e.g., overload, traffic redirection, etc.). Once the efficiency of a node is known, the controller 128 may be further configured to evaluate the effectiveness of auto-scaling triggers and to make modifications to the auto-scaling triggers where appropriate, as also described herein. For instance, the controller 128 may be configured to perform the steps, functions, and/or operations of the methods 200 and 300, described below, to adjust virtual network function auto-scaling triggers.

As illustrated in the example of FIG. 1, UEs 124 and 126 may communicate with satellite 130 via satellite links 132 and 134, respectively. In another example, UEs 124 and 126 may be limited to receiving low-bandwidth downlink communications. For instance, UEs 124 and 126 may include GPS receivers for receiving GPS broadcasts from satellite 130. In one example, satellite 130 may communicate with a ground station 136 via satellite link 138. In one example, satellite 130 may be controlled and/or operated by a same network service provider as core telecommunications network 110. In another example, satellite 130 may be controlled and/or operated by a different entity and may carry communications between UEs 124 and 126 and core telecommunications network 110.

As further illustrated in FIG. 1, UEs 124 and 126 may be within communication range of access networks 120 and 122, respectively via links 140 and 142. For instance, links 140 and 142 may comprise cellular links to access points 112 and 116 respectively, which may comprise eNodeBs in such an example.

UEs 124 and 126 may request services from core telecommunications network 110 via links 140 and 142, access points 112 and 116, and access networks 120 and 122, respectively. In one example, the service requests may be processed by controller 128. The service requests may be for a voice or video call service, a conference call service, a streaming media service, a data access service, an Internet access service, and so forth. Each of the service requests may include an identification of the requesting UE, the service requested, any content requested in addition to the service, a bandwidth requirement, a latency requirement, and so forth.

It should be noted that the system 100 has been simplified. In other words, the system 100 may be implemented in a different form than that illustrated in FIG. 1. For example, the system 100 may be expanded to include additional networks, and additional network elements (not shown) such as border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices. Thus, these and other modifications of the system 100 are all contemplated within the scope of the present disclosure.

Auto-scaling triggers typically seek to balance VNF performance with resource consumption. However, maintaining this balance becomes more challenging in cloud environments with varying configurations (e.g., as may be the case when deploying a software OPENSTACK platform) and varying patterns of network traffic. For instance, in some networks, it may not be possible to verify how efficiently a VNF makes use of the VNF's allocated resources. As an example, if a network operator were analyzing a VNF's performance as the performance related to packet forwarding, the operator may wish to know about the VNF's use of a data plane development kit (DPDK), the VNF's efforts to minimize user-space-to-kernel-space copying, the VNF's efforts to optimize scheduling, and the like.

Figure 2:
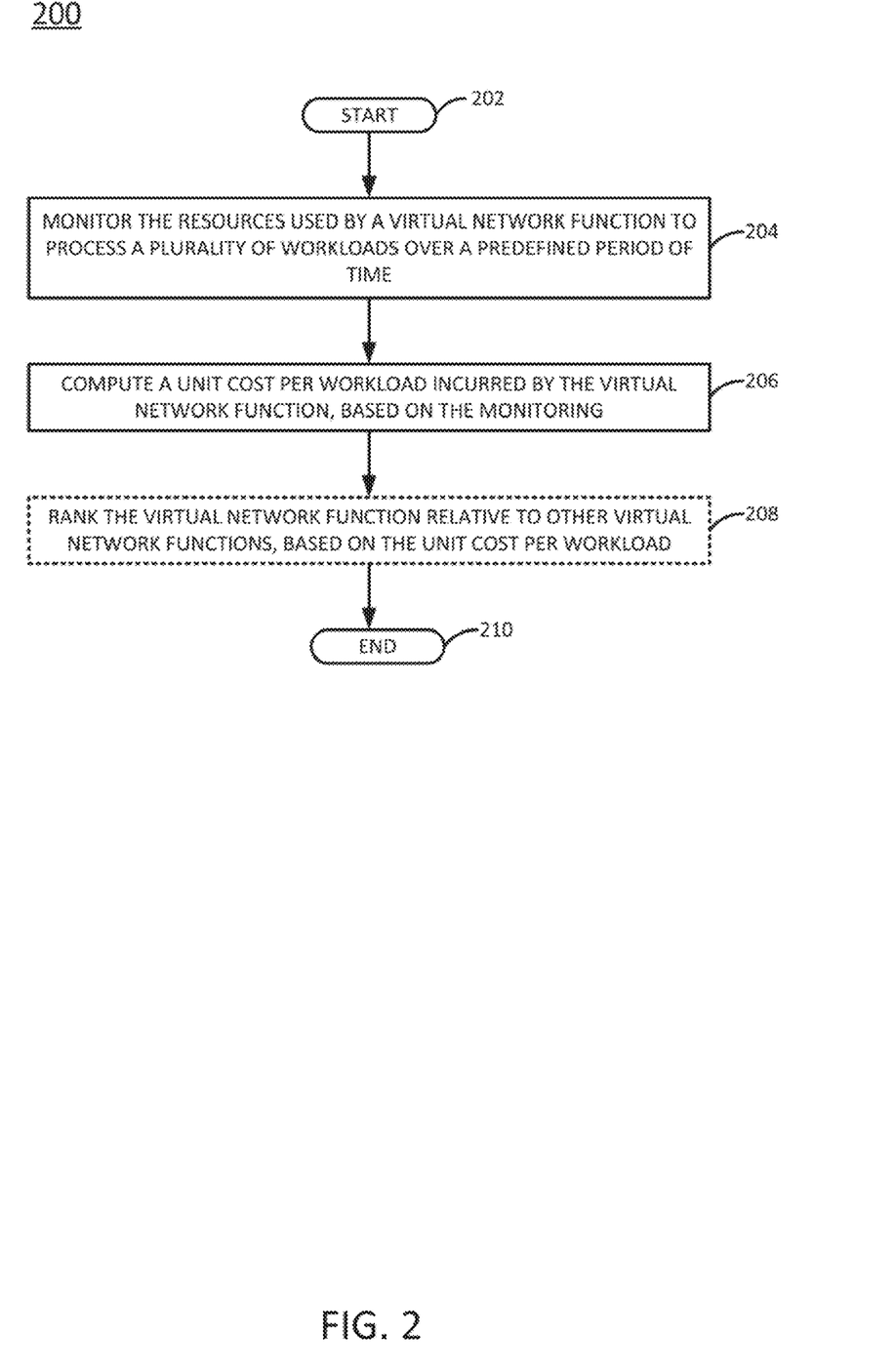
FIG. 2 illustrates a flowchart of an example method for evaluating the efficiency of a virtual network function, in accordance with the present disclosure.

FIG. 2 illustrates a flowchart of an example method 200 for evaluating the efficiency of a virtual network function, in accordance with the present disclosure. In one example, steps, functions and/or operations of the method 200 may be performed by a controller, e.g., controller 128 in conjunction with other components of the system 100. In one example, the steps, functions, or operations of method 200 may be performed by a computing device or system 400, and/or processor 402 as described in connection with FIG. 4 below. For example, computing device or system 400 may represent an SDN controller. For illustrative purposes, the method 200 is described in greater detail below in connection with an example performed by a processor, such as processor 402.

The method begins in step 202 and proceeds to step 204. In step 204, the processor may monitor the resources used by an VNF to process a plurality of workloads over a predefined period of time (e.g., x hours). The resources may include, for instance, compute, memory, and/or network resources, as well as other resources. In one example, the network traffic conditions may vary over the period of time, and thus may vary from workload to workload. For instance, a first workload may be processed under overloaded network traffic conditions (e.g., conditions during which network traffic exceeds a predefined threshold), while a second workload may be processed under traffic redirection conditions (e.g., conditions under which all network traffic to a particular IP address may be sent to a new IP address). It should be noted that the resources allocated to the VNF may not be static over the period of time, and, thus, resource availability and actual resource usage by the VNF may vary from workload to workload. For instance, the resources allocated to the VNF may be scaled up and/or down over the period of time in accordance with one or more triggers, as discussed in further detail below.

In step 206, the processor may compute a unit cost per workload incurred by the VNF, based on the monitoring performed in step 204. In one example, the unit cost per workload is computed as an average of a plurality of individual unit costs per workload, where each individual unit cost per workload represents the unit cost to process one of the plurality of workloads monitored in step 204. In one example, the unit cost U, of an individual workload i may be calculated as:

$$U(i) = \frac{(\alpha * Comp) + (\beta * Mem) + (\gamma * Net)}{WorkloadSize} \quad \text{(EQN. 1)}$$

where Comp represents the computing resources used to process the individual workload, Mem represents the memory resources used to process the individual workload, Net represents the network resources used to process the individual workload, WorkloadSize represents the size of the individual workload, and a, 13, and y represent weights that may be applied to the individual resource usages. In one example, the values for Comp, Mem, and Net may be expressed as amounts of resources used (e.g., millicores for compute resources, bytes for memory resources, bits per second for network bandwidth, etc.). In this case, the values for Comp, Mem, and Net may be normalized to common scale or unit of measure. In another example, the values for Comp, Mem, and Net may be expressed as the monetary costs of the resources used (e.g., y US dollars). In further examples, EQN. 1 may be extended to account for other types of resources used.

An average cost per unit workload may also be computed from the costs per unit workload of the individual workloads. In this case, the average cost per unit workload $U_{average}$ for a group of n workloads may be calculated as:

$$U_{average} = \Sigma_{i=1}^{n} U(i) \quad \text{(EQN. 2)}$$

In one example, the average cost per unit workload accounts for varying network traffic conditions over the period of time, as two or more of the individual workloads that are considered in the calculation may have been processed under different network traffic conditions. However, in other examples, it may be more useful to consider the cost per unit workload for each workload individually, or to compute an average specifically for certain types of network traffic conditions or specific types of workloads. For instance, an average cost per unit workload could be computed for all workloads processed under overload conditions, while a separate average cost per unit workload could be computed for all workloads processed under traffic redirection conditions. This may give a better view of the VNF's efficiency under different network traffic conditions, as the VNF may perform more efficiently under some network traffic conditions and less efficiently under other network traffic conditions. The VNF may also process some types of workloads more efficiently than other types of workloads.

Once the average cost per unit workload has been computed, the method 200 may proceed to optional step 208 (illustrated in phantom). In step 208, the processor may rank the VNF relative to other VNFs in the network based on the VNF's efficiency (e.g., unit cost per workload) as calculated in step 206. That is, the processor may calculate the unit cost per workload (as discussed in connection with step 206) for each VNF of a plurality of VNFs. The plurality of VNFs may then be ranked (e.g., from lowest unit cost per workload to highest unit cost per workload) in order to identify which VNFs process their workloads most efficiently. Knowing which VNFs process their workloads most efficiently may help a network operator to identify optimal VNF configurations, resource allocations, and/or workload distributions that will help improve the efficiencies of VNFs whose unit costs per workload are relatively high. The method 200 may end in step 210.

Figure 3:
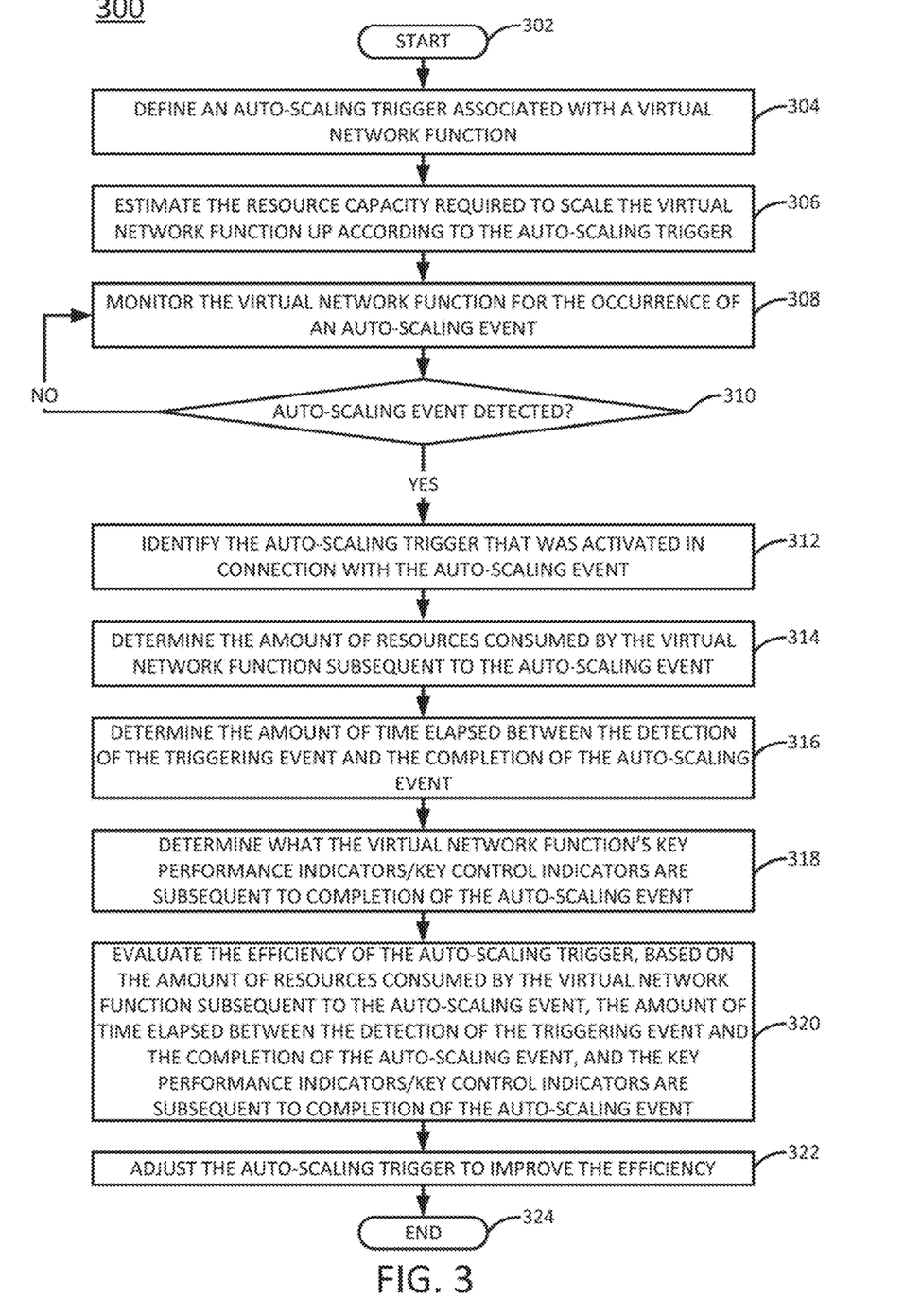
FIG. 3 illustrates a flowchart of an example method for adjusting virtual network function auto-scaling triggers, in accordance with the present disclosure.

FIG. 3 illustrates a flowchart of an example method 300 for adjusting virtual network function auto-scaling triggers, in accordance with the present disclosure. In one example, steps, functions and/or operations of the method 300 may be performed by a controller, e.g., controller 128 in conjunction with other components of the system 100. In one example, the steps, functions, or operations of method 300 may be performed by a computing device or system 400, and/or processor 402 as described in connection with FIG. 4 below. For example, computing device or system 400 may represent an SDN controller. For illustrative purposes, the method 300 is described in greater detail below in connection with an example performed by a processor, such as processor 402.

The method begins in step 302 and proceeds to step 304. In step 304, the processor may define an auto-scaling trigger associated with a VNF. In one example, the auto-scaling trigger is a scaling up trigger (e.g., a trigger that, when activated, causes additional resources to be extended to the VNF). In one example, a scaling up trigger may be a pre-rated VM scaling trigger, a KPI degradation scaling trigger, a resource utilization scaling trigger, or a VNF-specific scaling trigger. Each type of trigger may respond to a different type of triggering event (i.e., an event that causes an auto-scaling trigger to be activated).

For instance, a pre-rated VM scaling trigger may comprise a trigger that is activated when a traffic load (e.g., as measured in a number of concurrent sessions active on the VNF, a number of packets per second processed by the VNF, or in some other manners) exceeds a predefined threshold. The VM scaling trigger may specify the predefined threshold.

A KPI degradation scaling trigger may comprise a trigger that is activated when a value of a key performance metric falls below or exceeds a predefined threshold. Whether the value must fall below or exceed the threshold may depend on the KPI being measured. For instance, if the KPI is latency for a transactional response, the trigger may be activated when the value of the KPI exceeds a predefined threshold. Other KPIs that may be associated with a KPI degradation scaling trigger may include dropped calls (e.g., number and/or frequency), data throughput, blocked calls (e.g., number and/or frequency), threshold increases in noise and/or interference, video pauses, video blurring, and/or other KPIs.

A resource utilization scaling trigger may comprise a trigger that is activated when the VNF's usage of a key resource (such as central processing unit (CPU), memory, network bandwidth, storage input/output (I/O), or the like) exceeds a predefined threshold.

A VNF-specific scaling trigger may comprise a trigger that is activated when one of the VNF's internal metrics (e.g., queue length, dynamic memory not freed, and/or the like) exceeds a predefined threshold. VNF-specific scaling triggers may vary from VNF to VNF. For instance, a first VNF may set a first threshold for maximum allowable queue length, while a second VNF may set a different second threshold for maximum allowable queue length.

In step 306, the processor may estimate the resource capacity (e.g., amount of CPU, memory, network I/O, bandwidth, etc.) required to scale the VNF up according to the auto-scaling trigger. For instance, the processor may estimate an amount by which to increase the resources allocated to the VNF or the capacity by which to scale up the VNF (e.g., by how much to reduce processing latency, by how much to reduce VNF queue length, how many more packets per second the VNF should be able to process, etc.) based on the triggering event (e.g., the threshold exceeded). The amount by which to increase the resources or the capacity by which to scale up the VNF may be stepped. That is, the resources may be increased by a first amount if the traffic load falls within a first range, increased by a second amount if the traffic load falls within a second range, and so on.

In step 308, the processor may monitor the VNF for the occurrence of an auto-scaling event. That is, the processor may monitor the VNF for the activation of an auto-scaling trigger that causes the resources allocated to the VNF to be scaled out.

In step 310, the processor may determine if an auto-scaling event has occurred. If the processor determines in step 310 that no auto-scaling event has occurred, then the method 300 may return to step 308 and continue to monitor the VNF. If, on the other hand, the processor determines in step 310 that an auto-scaling event has occurred, then the method 300 may proceed to step 312.

In step 312, the processor may identify the auto-scaling trigger that was activated in connection with the auto-scaling event. For instance, the processor may identify the particular pre-rated VM scaling trigger, KPI degradation scaling trigger, resource utilization scaling trigger, or VNF-specific scaling trigger that was activated.

In step 314, the processor may determine the amount of resources consumed by the VNF subsequent to the auto-scaling event. For instance, in order to evaluate the efficiency of the auto-scaling trigger, it may be useful to know whether the amount of resources consumed subsequent to the auto-scaling event are within the bounds of the estimated resource capacity (e.g., as estimated in step 306).

In step 316, the processor may determine the amount of time elapsed between the detection of the triggering event associated with the auto-scaling trigger and the completion of the auto-scaling event. For instance, in order to evaluate the efficiency of the auto-scaling trigger, it may be useful to know how long it takes for the triggering event to be addressed.

In step 318, the processor may determine what the VNF's KPIs and/or key control indicators (KCIs) are subsequent to completion of the auto-scaling event. For instance, in order to evaluate the efficiency of the auto-scaling trigger, it may be useful to know whether the auto-scaling event produced KPIs and/or KCIs that are within acceptable ranges (where the acceptable ranges may be predefined, e.g., by a network operator).

In step 320, the processor may evaluate the efficiency of the auto-scaling trigger, based on the amount of resources consumed by the VNF subsequent to the auto-scaling event (as determined in step 314), the amount of time elapsed between the detection of the triggering event associated with the auto-scaling trigger and the completion of the auto-scaling event (as determined in step 316), and the VNF's KPIs and/or key control indicators (KCIs) subsequent to completion of the auto-scaling event (as determined in step 318). In one example, evaluation of the auto-scaling trigger's efficiency, E, may be calculated according to:

$$E = (r_{actual} - r_{estimated}) * (t_{complete} - t_{detected}) * (k_{min} - k_{actual}) \quad \text{(EQN. 3)}$$

where $r_{actual}$ represents the amount of resources actually consumed by the VNF subsequent to the auto-scaling event, $r_{estimated}$ represents the estimated resource capacity for the auto-scaling trigger, $t_{complete}$ represents the time at which the auto-scaling event was completed, $t_{detected}$ represents the time at which the triggering event associated with the auto-scaling trigger was detected, $k_{min}$ represents a minimum value for a KPI or KCI for the VNF, and $k_{actual}$ represents the actual value of the KPI or KCI for the VNF KPIs subsequent to completion of the auto-scaling event. In one example, $(r_{actual} - r_{estimated})$, $(t_{complete} - t_{detected})$, and $(k_{min} - k_{actual})$ may each be weighted with a unique weight that reflect the impact or importance of the particular difference on the overall efficiency of the auto-scaling trigger. For instance, in some cases, consumption of resources beyond the estimated resource capacity may be considered acceptable as long as the time elapsed between the detection of the triggering event associated with the auto-scaling trigger and the completion of the auto-scaling event does not exceed some predefined duration of time.

In step 322, the processor may adjust the auto-scaling trigger to improve the auto-scaling trigger's efficiency, based on the evaluation performed in step 320. For instance, if the auto-scaling event consumed an amount of resources that exceeded the estimated resource capacity, the processor may increase the estimated resource capacity. If the amount of time elapsed between the detection of the triggering event associated with the auto-scaling trigger and the completion of the auto-scaling event was not within an acceptable range, then the triggering event may be adjusted (e.g., a threshold for activating the auto-scaling trigger may be raised or lowered to activate the auto-scaling trigger sooner). If the auto-scaling event produced a KPI or KCI that was not within an acceptable range, then the triggering event may be adjusted (e.g., a threshold for activating the auto-scaling trigger may be raised or lowered to activate the auto-scaling trigger sooner). In one example, the adjustment may target a value of the efficiency measure (e.g., calculated according to EQN. 3, above) that falls within some predefined, desired range.

The method 300 may end in step 324. However, the method 300 may be repeated for a plurality of individual auto-scaling triggers, in order to evaluate the efficiency of each of the individual auto-scaling triggers as their activation is detected. Thus, rather than end in step 324, after step 322 is performed, the method 300 may return to step 304 and proceed as described above to evaluate another auto-scaling trigger.

It should be noted that the methods 200 and 300 may be expanded to include additional steps. It should also be noted that although not specifically specified, one or more steps, functions or operations of the methods 200 and 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIGS. 2 and 3 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200 and 300 may comprise optional steps, or can be combined, separated, and/or performed in a different order from that described above, without departing from the example embodiments of the present disclosure. However, the use of the term "optional step" is intended to only reflect different variations of a particular illustrative embodiment and is not intended to indicate that steps not labelled as optional steps to be deemed to be essential steps.

Figure 4:
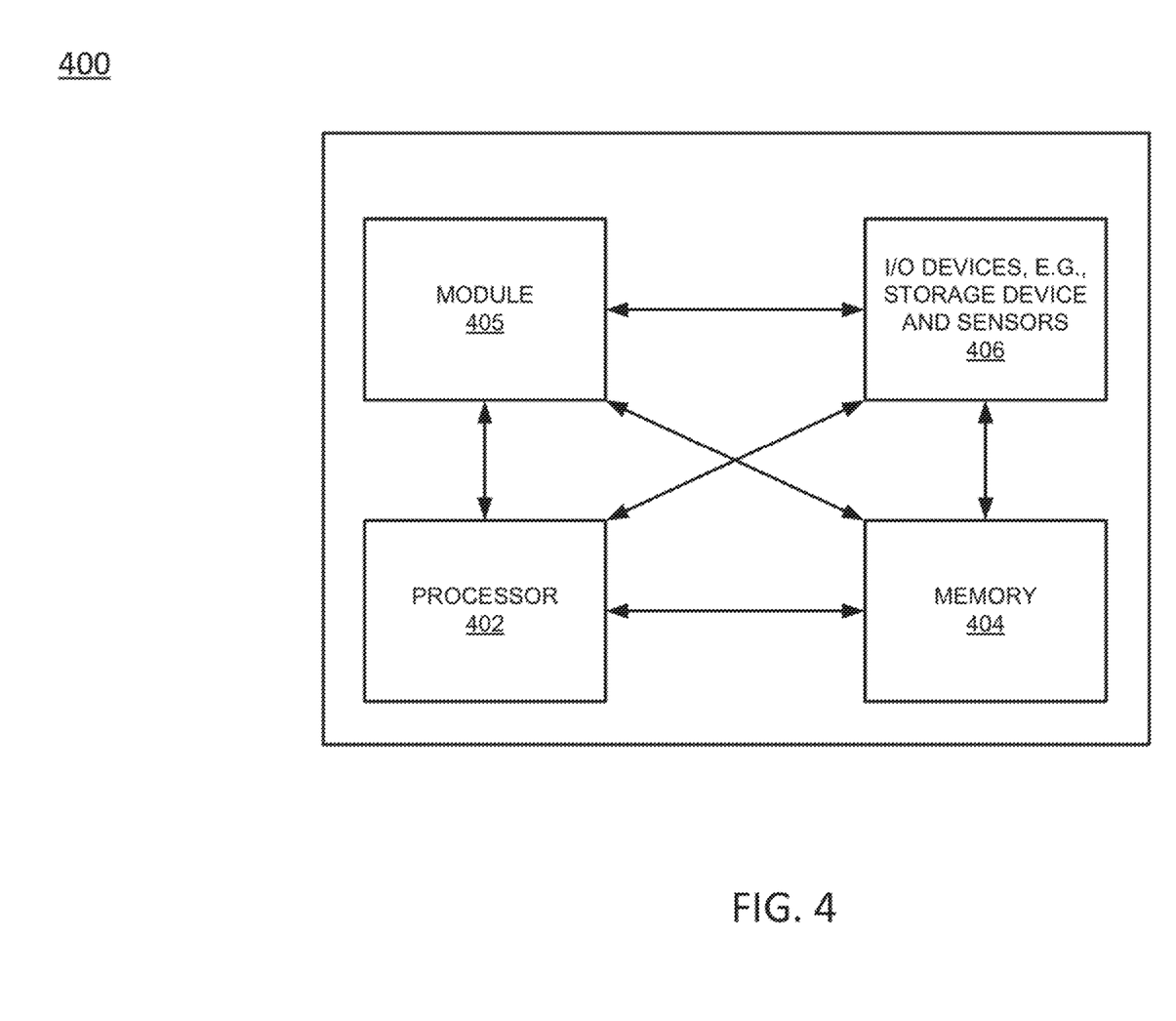
FIG. 4 illustrates an example high-level block diagram of a computer specifically programmed to perform the steps, functions, blocks, and/or operations described herein.

FIG. 4 depicts a high-level block diagram of a computing device programmed, or configured to perform the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for adjusting virtual network function auto-scaling triggers, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or 300 as discussed above is implemented in a distributed or parallel manner for a particular illustrative example, i.e., the steps of the above method 200 or 300, or the entire method 200 or 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method(s) discussed above can be used to configure a hardware processor to perform the steps, functions and/or operations of the above disclosed methods 200 and 300. In one embodiment, instructions and data for the present module or process 405 for adjusting virtual network function auto-scaling triggers (e.g., a software program comprising computer-executable instructions) can be loaded into memory 404 and executed by hardware processor element 402 to implement the steps, functions or operations as discussed above in connection with the illustrative methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for adjusting virtual network function auto-scaling triggers (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
   determining, by a processor deployed in a network function virtualization infrastructure, an amount of resources consumed by a virtual network function subsequent to a scaling of the amount of the resources in response to an occurrence of a predefined trigger event;
   determining, by the processor, a difference between the amount of resources consumed by the virtual network function subsequent to the scaling and an estimated resource capacity associated with the predefined trigger event;
   determining, by the processor, a value of a key performance indicator for the virtual network function subsequent to a completion of the scaling;
   evaluating, by the processor, an efficiency of the predefined trigger event that triggers the scaling, based on the amount of the resources consumed by the virtual network function subsequent to the scaling and the key performance indicator for the virtual network function subsequent to the completion of the scaling; and
   adjusting, by the processor, the predefined trigger event based on the evaluating.

2. The method of claim 1, wherein the predefined trigger event caused the scaling to occur in response to a traffic load processed by the virtual network function exceeding a predefined threshold.

3. The method of claim 2, wherein the traffic load comprises a number of concurrent sessions being processed by the virtual network function.

4. The method of claim 2, wherein the traffic load comprises a number of packets per second being processed by the virtual network function.

5. The method of claim 1, wherein the predefined trigger event caused the scaling to occur in response to the value of the key performance indicator falling below a predefined threshold.

6. The method of claim 1, wherein the predefined trigger event caused the scaling to occur in response to the value of the key performance indicator exceeding a predefined threshold.

7. The method of claim 1, wherein the predefined trigger event caused the scaling to occur in response to a usage by a virtual machine of a resource of the resources exceeding a predefined threshold.

8. The method of claim 1, wherein the predefined trigger event caused the scaling to occur in response to an internal metric of the virtual network function exceeding a predefined threshold.

9. The method of claim 8, wherein the internal metric is a queue length.

10. The method of claim 8, wherein the internal metric is an amount of dynamic memory not freed.

11. The method of claim 1, wherein the evaluating indicates that the amount of resources consumed by the virtual network function exceeds the estimated resource capacity associated with the predefined trigger event.

12. The method of claim 11, wherein the adjusting comprises:
increasing, by the processor, the estimated resource capacity associated with the predefined trigger event.

13. The method of claim 1, wherein the evaluating indicates that an amount of time elapsed between a detection of the predefined trigger event and the completion of the scaling exceeds a predefined threshold.

14. The method of claim 13, wherein the adjusting comprises:
adjusting, by the processor, a predefined threshold for activating the predefined trigger event to cause the predefined trigger event to activate sooner.

15. The method of claim 1, wherein the evaluating indicates that the value of the key performance indicator is outside a predefined range.

16. The method of claim 15, wherein the adjusting comprises:
adjusting, by the processor, a predefined threshold for activating the predefined trigger event to cause the predefined trigger event to activate sooner.

17. The method of claim 1, wherein the adjusting targets a value of an efficiency measure that falls within a predefined range.

18. A non-transitory computer-readable medium storing instructions which, when executed by a processor deployed in a network function virtualization infrastructure, cause the processor to perform operations, the operations comprising:
determining an amount of resources consumed by a virtual network function subsequent to a scaling of the amount of the resources in response to an occurrence of a predefined trigger event;
determining a difference between the amount of resources consumed by the virtual network function subsequent to the scaling and an estimated resource capacity associated with the predefined trigger event;
determining a value of a key performance indicator for the virtual network function subsequent to a completion of the scaling;
evaluating an efficiency of the predefined trigger event that triggers the scaling, based on the amount of the resources consumed by the virtual network function subsequent to the scaling, and the key performance indicator for the virtual network function subsequent to the completion of the scaling; and
adjusting the predefined trigger event based on the evaluating.

19. The non-transitory computer-readable medium of claim 18, wherein the evaluating indicates that the amount of resources consumed by the virtual network function exceeds the estimated resource capacity associated with the predefined trigger event.

20. A system comprising:
a processor deployed in a network function virtualization infrastructure; and
a non-transitory computer-readable medium storing instructions which, when executed by the processor, cause the processor to perform operations, the operations comprising:
determining an amount of resources consumed by a virtual network function subsequent to a scaling of the amount of the resources in response to an occurrence of a predefined trigger event;
determining a difference between the amount of resources consumed by the virtual network function subsequent to the scaling and an estimated resource capacity associated with the predefined trigger event;
determining a value of a key performance indicator for the virtual network function subsequent to a completion of the scaling;
evaluating an efficiency of the predefined trigger event that triggers the scaling, based on the amount of resources consumed by the virtual network function subsequent to the scaling and the completion of the scaling, and the key performance indicator for the virtual network function subsequent to the completion of the scaling; and
adjusting the predefined trigger event based on the evaluating.

* * * * *